United States Patent
Watanabe et al.

(10) Patent No.: US 7,418,127 B2
(45) Date of Patent: Aug. 26, 2008

(54) APPARATUS FOR TESTING INFRARED CAMERA

(75) Inventors: Masahito Watanabe, Saitama-ken (JP);
Takayuki Tsuji, Saitama-ken (JP);
Hiroshi Hattori, Saitama-ken (JP);
Nobuharu Nagaoka, Saitama-ken (JP);
Izumi Takatsudo, Saitama-ken (JP);
Masakazu Saka, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 948 days.

(21) Appl. No.: 10/675,348

(22) Filed: Sep. 30, 2003

(65) Prior Publication Data

US 2004/0066965 A1   Apr. 8, 2004

(30) Foreign Application Priority Data

Oct. 2, 2002   (JP)   ............................. 2002-290234

(51) Int. Cl.
*G06K 9/00* (2006.01)
(52) U.S. Cl. .................... 382/154; 348/164; 348/187
(58) Field of Classification Search ................. 348/187, 348/164, 207.7
See application file for complete search history.

(56) References Cited

U.S. PATENT DOCUMENTS

| | | | | |
|---|---|---|---|---|
| 3,444,378 A | * | 5/1969 | Schuster et al. | 250/363.01 |
| 4,780,613 A | * | 10/1988 | Berstein et al. | 250/343 |
| 5,033,015 A | * | 7/1991 | Zwirn | 702/116 |
| 5,902,417 A | * | 5/1999 | Lillington et al. | 136/246 |

FOREIGN PATENT DOCUMENTS

| | | |
|---|---|---|
| JP | 08-276787 | 10/1996 |
| JP | 10-116945 | 5/1998 |
| JP | 11-325889 | 11/1999 |
| JP | 2001-091984 | 4/2001 |
| JP | 2001-112028 | 4/2001 |

OTHER PUBLICATIONS

Nagasawa et al., "Application of Fourier Transform Infrared Emission Spectrometry to Surface Analysis," Mar./Apr. 1984, vol. 38, 168-173.*

* cited by examiner

*Primary Examiner*—Matthew C. Bella
*Assistant Examiner*—John W Lee
(74) *Attorney, Agent, or Firm*—Carrier, Blackman & Associates, P.C.; Wiliam D. Blackman; Joseph P. Carrier

(57) ABSTRACT

An apparatus for testing infrared cameras includes: a front plate which has holes arranged in line, and which is adapted to emit an amount of infrared light; and a back plate which is disposed in parallel to and behind the front plate as viewed from infrared cameras to be tested, and which is adapted to emit a different amount of infrared light when compared with the front plate. The back plate is disposed at lower portions of pillars. On the other hand, the front plate is made vertically movable in front of the back plate and along the pillars. By being controlled by a controller, the front plate is movable from the ground height to a level corresponding to approximately two times the height of the back plate.

12 Claims, 8 Drawing Sheets

APPARATUS FOR TESTING INFRARED CAMERA

BACKGROUND OF THE INVENTION

1. Field of the Invention

The present invention relates to an apparatus for testing infrared cameras, which are installed on a vehicle, for measuring distances to objects.

Priority is claimed on Japanese Patent Application No. 2002-290234, filed Oct. 2, 2002, the content of which is incorporated herein by reference.

2. Description of Related Art

A three-dimensional measuring method has been known in the art in which a distance to an object is determined using parallax between a pair of object images taken by a pair of cameras (stereo cameras). In such a method, an apparatus for correcting images must be used in order to accurately measure a distance to an object by correcting shift of images due to distortions of lenses and variations in focal lengths thereof. In an example of such an apparatus, a specific image pattern, such as a regular grid pattern, for measuring an amount of correction is simultaneously taken in advance using both stereo cameras, and the amounts of corrections in the coordinates are calculated pixel by pixel with regard to each image taken by each of the cameras. The calculated results are stored as a correction table for the coordinates, and the data stored in an image memory are corrected pixel by pixel using the correction table for the coordinates so that accurate image data are obtained. In a method disclosed in, for example, Japanese Unexamined Patent Application, First Publication No. Hei 11-325889, the corrections in shifting of images due to distortions of lenses and variations in focal lengths thereof are executed only in the vertical direction.

As an example to which the above-mentioned three-dimensional measuring method using stereo cameras is applied, a system is known which detects obstacles in front of a vehicle earlier than the driver of the vehicle does, and which notifies the driver of the existence of the obstacles. In this case, in general, infrared cameras, which enable taking infrared images, are used as the stereo cameras, in order to aid driving under poor visibility conditions.

As mentioned above, in order to correct shifting of images due to distortions of lenses and variations in focal lengths thereof, a specific image pattern, such as a regular grid pattern, for measuring an amount of correction is simultaneously taken in advance using both stereo cameras, and the amounts of corrections in the coordinates are calculated pixel by pixel with regard to each image taken by each of the cameras; however, in the case of infrared cameras used for the stereo cameras, a problem is encountered in that it is difficult to form a regular grid pattern which can be accurately taken by the infrared cameras.

SUMMARY OF THE INVENTION

In view of the above circumstances, an object of the present invention is to provide an apparatus for testing infrared cameras, which enables an easy measurement of errors in projected coordinates of objects in both the horizontal direction and vertical direction.

In order to achieve the above object, the present invention provides an apparatus for testing infrared cameras including: a cover plate which has holes arranged in line, and which is adapted to emit an amount of infrared light; and an emission source which is disposed in parallel to and behind the cover plate as viewed from infrared cameras to be tested, and which is adapted to emit a different amount of infrared light when compared with the cover plate.

According to the apparatus for testing infrared cameras configured as described above, by disposing the emission source in parallel to and behind the cover plate which has holes arranged in line, and by making the emission source emit infrared light having an intensity which is greater than that of the infrared light emitted from the cover plate, infrared light emitting portions aligned in line can be formed using the infrared light passing through the holes formed in the cover plate. On the other hand, by making the emission source emit infrared light having an intensity which is less than that of the infrared light emitted from the cover plate, infrared light non-emitting portions aligned in line can be formed due to differences between the intensity of the infrared light emitted from the emission source and the intensity of the infrared light emitted from a portion of the cover plate other than the holes.

In the apparatus for testing infrared cameras, the emission source may include a metal plate, and a heat source which is connected to the metal plate.

According to the apparatus for testing infrared cameras configured as described above, infrared light can be uniformly emitted from the metal plate by heating the metal plate using the heat source, or by cooling the metal plate using the heat source. By making the uniformly emitted infrared light pass through the holes formed in the cover plate, the infrared light emitting portions which are accurately aligned or the infrared light non-emitting portions which are accurately aligned can be easily formed due to difference between the intensity of the infrared light emitted from the emission source and the intensity of the infrared light emitted from the cover plate.

In the apparatus for testing infrared cameras, the emission source may comprises a metal plate, and an element which is adhered to the metal plate, and which has an infrared emissivity that is higher than that of the cover plate.

According to the apparatus for testing infrared cameras configured as described above, because the element having an infrared emissivity that is higher than that of the cover plate is adhered to the metal plate, the infrared light emitting portions which are accurately aligned can be formed at low cost by making the element uniformly emit infrared light, and by making the infrared light pass through the holes formed in the cover plate.

In the apparatus for testing infrared cameras, the cover plate may have been subjected to a processing for reducing infrared light reflection.

According to the apparatus for testing infrared cameras configured as described above, because the cover plate has been subjected to a processing for reducing infrared light reflection, the infrared light emitted from the emission source can be prevented from being reflected by a vehicle on which the infrared cameras to be tested are installed, and also, reflected infrared light can be prevented from being reflected by the cover plate.

In the apparatus for testing infrared cameras, the cover plate may be vertically movable in front of the emission source as viewed from the infrared cameras to be tested from a first position at which testing of the infrared cameras is executed to a second position which is higher than the first position. The second position may be preferably set to be sufficiently higher than the first position so that the cover plate is not heated by a heat source of the emission source.

According to the apparatus for testing infrared cameras configured as described above, the vertical level of the cover plate can be adjusted in accordance with the vertical levels of the infrared cameras to be tested even when the vertical levels of the infrared cameras are changed. In addition, by moving the cover plate from a position in front of the emission source so as to make the distance between the cover plate and the emission source greater, the cover plate is prevented from being heated unnecessarily, which leads to emission of unnecessary infrared light, or the cover plate is prevented from being cooled unnecessarily, which leads to non-emission of necessary infrared light.

DETAILED DESCRIPTION OF THE INVENTION

An embodiment of the present invention will be explained below with reference to appended drawings.

Figure 1:
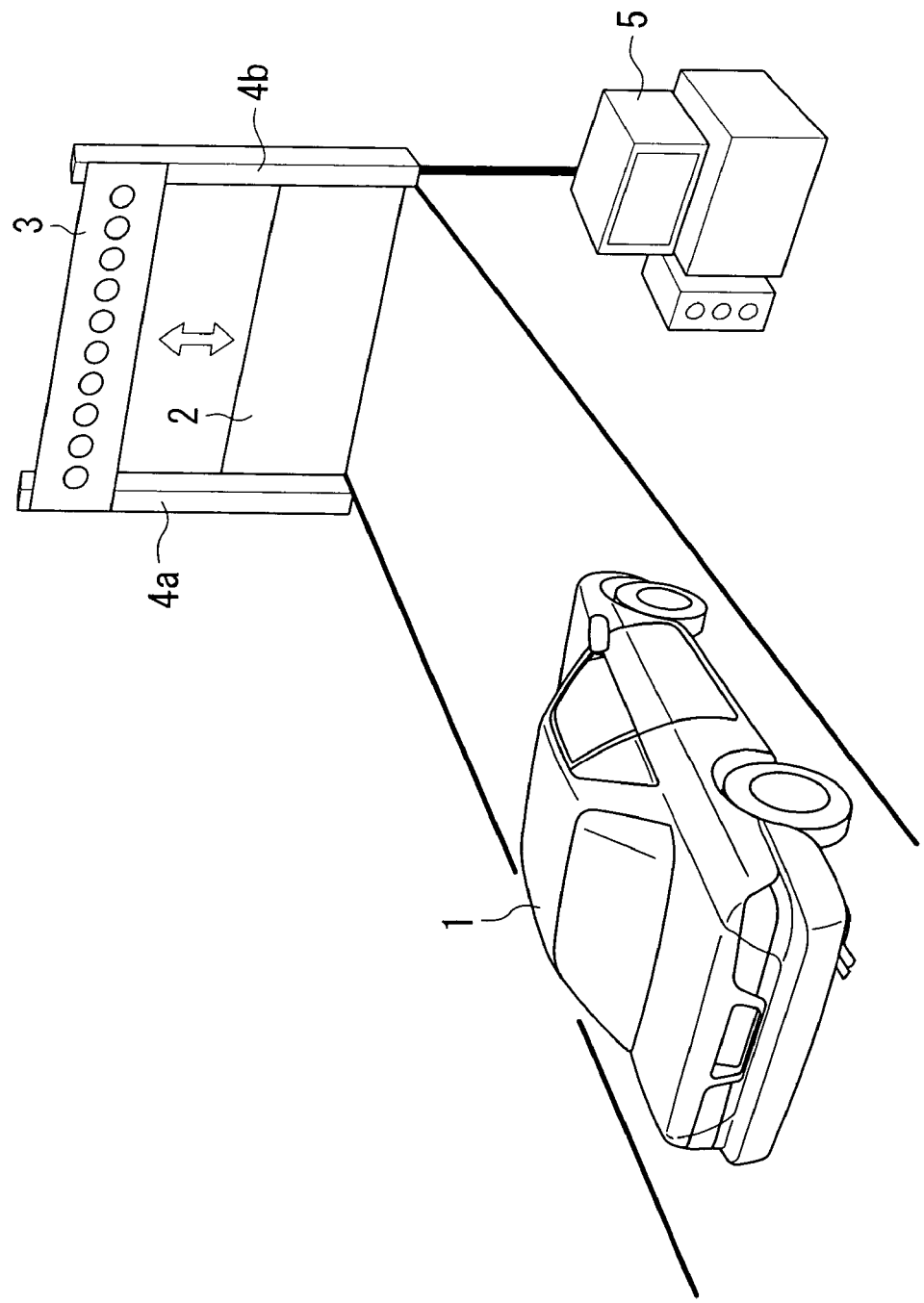
FIG. 1 is a perspective view showing an embodiment of an apparatus for testing infrared cameras according to the present invention.
Figure 2:
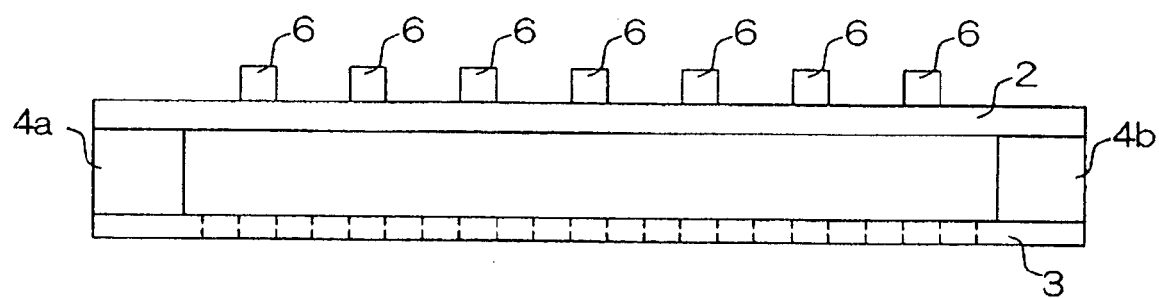
FIG. 2 is a plan view showing a target portion of the apparatus for testing infrared cameras according to the above embodiment.
Figure 3:
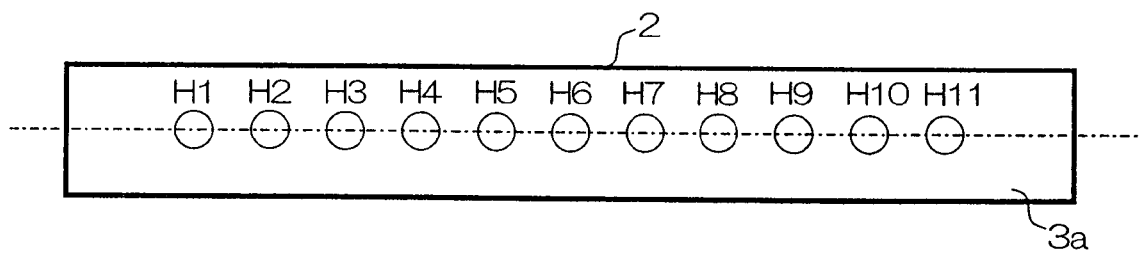
FIG. 3 is a front view showing the target portion of the apparatus for testing infrared cameras according to the above embodiment.

FIG. 1 is a perspective view showing an embodiment of an apparatus for testing infrared cameras according to the present invention, which is to be installed in a manufacturing line in a plant. FIG. 2 is a plan view showing a target portion of the apparatus for testing infrared cameras according to the present embodiment. FIG. 3 is a front view showing the target portion of the apparatus for testing infrared cameras.

As shown in FIG. 1, the apparatus for testing infrared cameras according to the present embodiment includes a back plate 2 and a front plate 3 which together form a target portion that is disposed in front of a vehicle 1 which is provided with infrared cameras to be tested at the front end thereof. The back plate 2, formed of an aluminum plate, acts as an infrared light emission source when the entirety thereof is heated or cooled. The front plate 3, also formed of an aluminum plate, is disposed closer to the vehicle 1 than the back plate 2. Circular through holes (identified as H1-H11 in FIG. 3, hereinafter referred to as target holes) having the same size with respect to each other are formed in the front plate 3 at regular intervals. As shown by the dotted lines in FIG. 2, the target holes H1-H11 extend all of the way through the front plate 3.

The back plate 2 is a plate-shaped element whose width in the horizontal direction is approximately the same as that of the vehicle 1, and whose height in the vertical direction is sufficiently large when compared with the vehicle 1 regardless of models of the vehicle 1 so that testing of the infrared cameras is allowed wherever the infrared cameras are installed on the vehicle 1. The back plate 2 is disposed at lower portions of pillars 4a and 4b. On the other hand, the front plate 3 is made vertically movable in front of the back plate 2 and along the pillars 4a and 4b. By being controlled by the controller 5, the front plate 3 is movable from the ground height to a level corresponding to approximately two times the height of the back plate 2. Accordingly, the vertical level of the target portion including the back plate 2 and the front plate 3 can be adjusted to a level of the infrared cameras even when the level of the infrared cameras are changed depending on the models of the vehicle 1.

The back plate 2 and the front plate 3 will be further explained below in detail. As shown in FIG. 2, the back plate 2 is provided with temperature adjusting devices 6 such as heaters or Peltier elements on the backside thereof as viewed from the vehicle 1 in order to execute heating or cooling of the entirety of the back plate 2.

The direct transmission of heat from the back plate 2 to the front plate 3 is prevented by supporting the front plate 3 by the pillars 4a and 4b so that the front plate 3 is separated from the back plate 2 by an appropriate distance, and by fabricating the pillars 4a and 4b with a material having low thermal conductivity. When the front plate 3 is moved to the uppermost portions of the pillars 4a and 4b, the front plate 3 is not affected by heating and cooling of the back plate 2.

As shown in FIG. 3, the front plate 3 has the circular target holes (eleven target holes H1 to H11 in this embodiment) which are arranged in line in the horizontal direction along the center line of the front plate 3 at a regular interval; therefore, the back plate 2 can be seen from the vehicle 1 through the target holes H1 to H11. In addition, raised paper 3a having low reflectance is adhered to the front face (front surface) of the front plate 3 as viewed from the vehicle so that the infrared light reflected by the vehicle 1 or emitted from the vehicle 1 will not be reflected by the front plate 3 and will not return to the vehicle 1.

In the target portion as configured above, the back plate 2 and the front plate 3 are overlaid each other, and the back plate 2 is heated. The infrared light emitted from the back plate 2 is taken by the infrared cameras installed on the vehicle 1 through the target holes H1 to H11 formed in the front plate 3 to obtain a grayscale image shown in FIG. 4. A binarization process is applied to the grayscale image shown in FIG. 4 to obtain a binarized image shown in FIG. 5.

Figure 4:
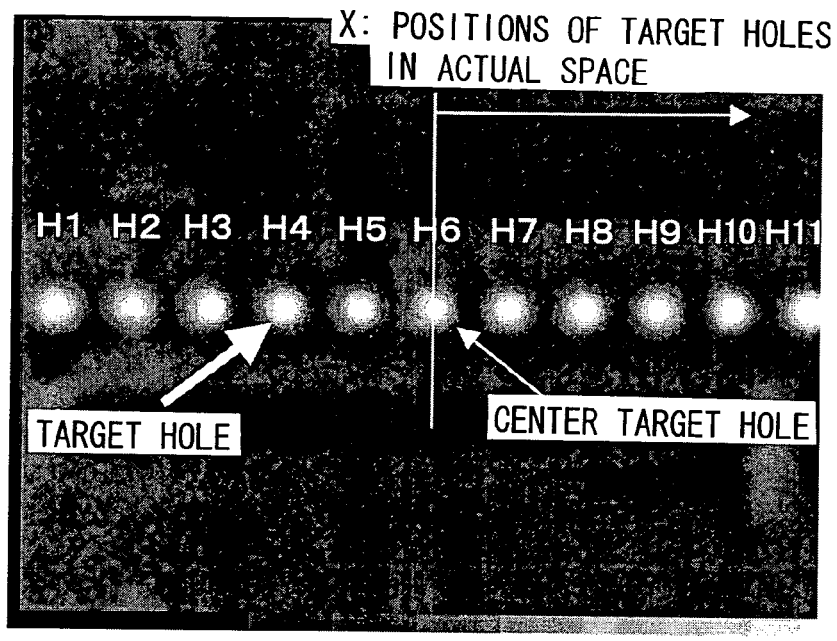
FIG. 4 is a diagram showing a grayscale image of the target portion of the apparatus for testing infrared cameras according to the above embodiment taken by infrared cameras installed on a vehicle.

In contrast, when the back plate 2 is cooled, the infrared light emitted from the front plate is take by the infrared cameras; therefore, another binarized image is obtained which is reversed in white and black when compared with the binarized image shown in FIG. 4.

In a state in which the back plate 2 is heated to make the back plate 2 emit infrared light, infrared light having higher intensity can be obtained by adhering a material having an infrared reflectance greater than 0.9 such as paper or carbon to the back plate 2. Accordingly, when infrared light having higher intensity is desired, the back plate 2 is heated using the temperature adjusting devices 6 in addition to adhering paper or carbon to the back plate 2. When low cost is desired for the apparatus for testing infrared cameras, the temperature adjusting devices 6 may be omitted, and just the back plate 2 having paper or carbon thereon may be used as the infrared light emission source.

Next, a verification process for the on-vehicle infrared cameras using the apparatus for testing infrared cameras of the present embodiment will be explained below.

Figure 6:
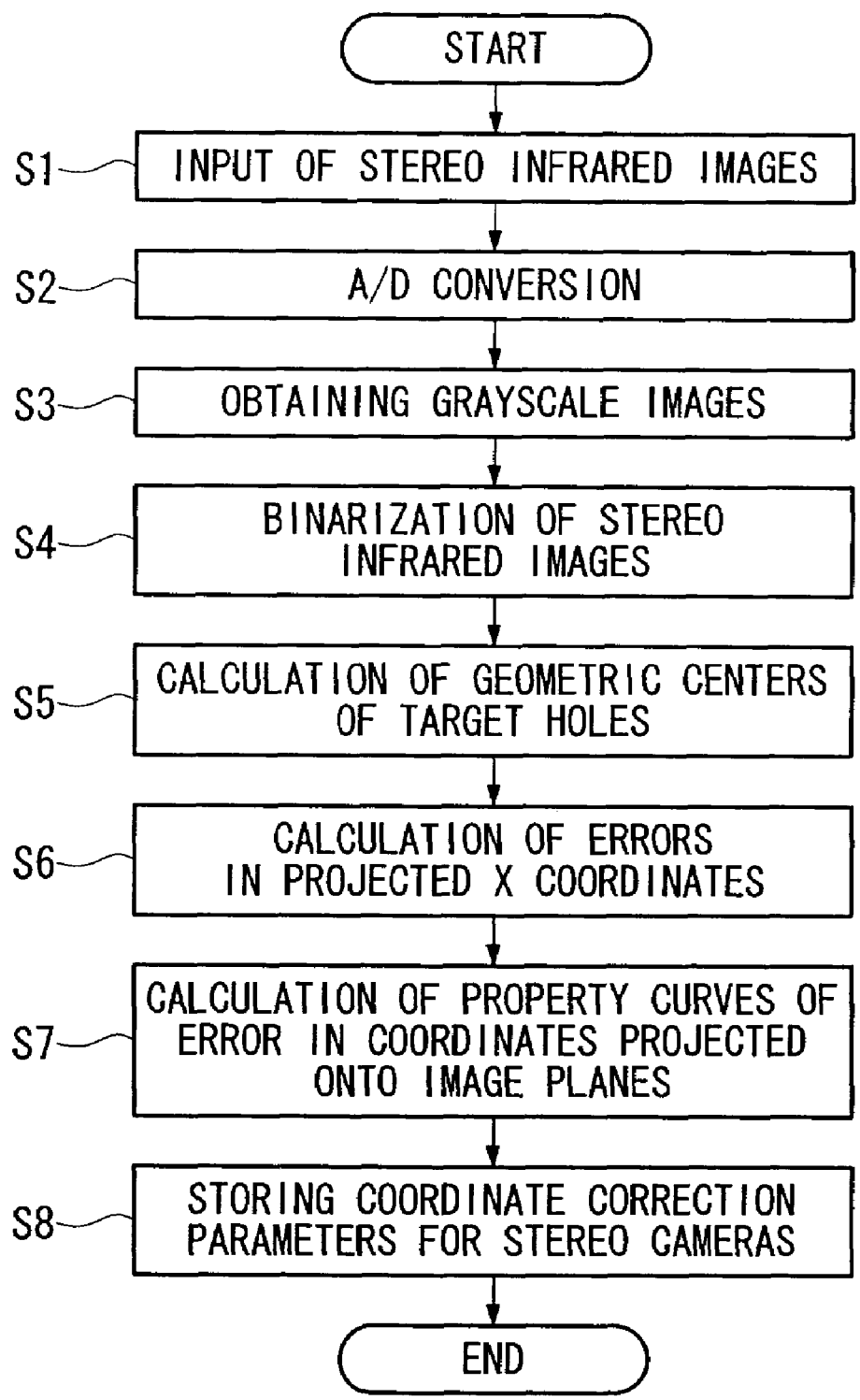
FIG. 6 is a flowchart showing a process for testing infrared cameras, in which the apparatus for testing infrared cameras according to the above embodiment and an image processing unit installed in the vehicle are used.

FIG. 6 is a flowchart showing the verification process for the infrared cameras, in which the apparatus for testing infrared cameras according to the above embodiment and an image processing unit installed in the vehicle 1 are used.

In FIG. 6, the image processing unit obtains infrared images as an output signal of the stereo infrared cameras (step S1), executes an A/D conversion (step S2), and stores grayscale images in an image memory (step S3). A right image of the target holes H1 to H11 is obtained by a right infrared camera, and a left image of the target holes H1 to H11 is obtained by a left infrared camera.

Figure 5:
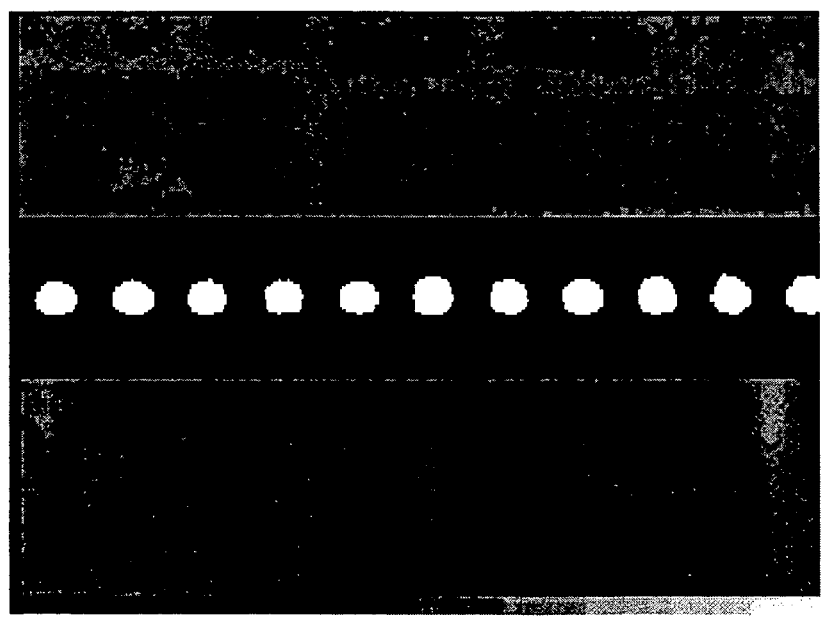
FIG. 5 is a diagram showing a binarized image obtained by applying a binarization process to the grayscale image of the target portion.

In step S3, the grayscale images such as shown in FIG. 4 is obtained, and then a binarization process is applied to each of the right and left images to obtain the binarized images such as shown in FIG. 5 (step S4). In the binarization process, regions in the image that are brighter than a brightness threshold ITH are deemed as "1" (i.e., white), and regions in the image that are darker than the brightness threshold ITH are deemed as "0" (i.e., black).

Next, the geometric center of each of the target holes H1 to H11 in the binarized image is calculated (step S5).

Next, an error in projected coordinates are calculated (step S6) based on the differences between the theoretical projected X coordinates and the observed X coordinates of the geometric centers obtained in step S5. More specifically, the coordinates of the target holes H1 to H11 in actual space projected onto the image (the theoretical projected X coordinates) are obtained using Equation (1) shown below. The errors in projected X coordinates are obtained by subtracting the observed X coordinates of the geometric centers from the theoretical projected X coordinates.

$$x = (F \cdot X)/(p \cdot Z)$$ Equation (1)

In Equation (1), "x" indicates the coordinate of the target hole projected onto the image, "X" indicates position of the target hole in the actual space shown in FIG. 4, "Z" indicates the distance between the target hole in the actual space and the camera, "p" indicates pitch of pixels, and "F" indicates the focal length of the lens of the camera.

Figure 7:
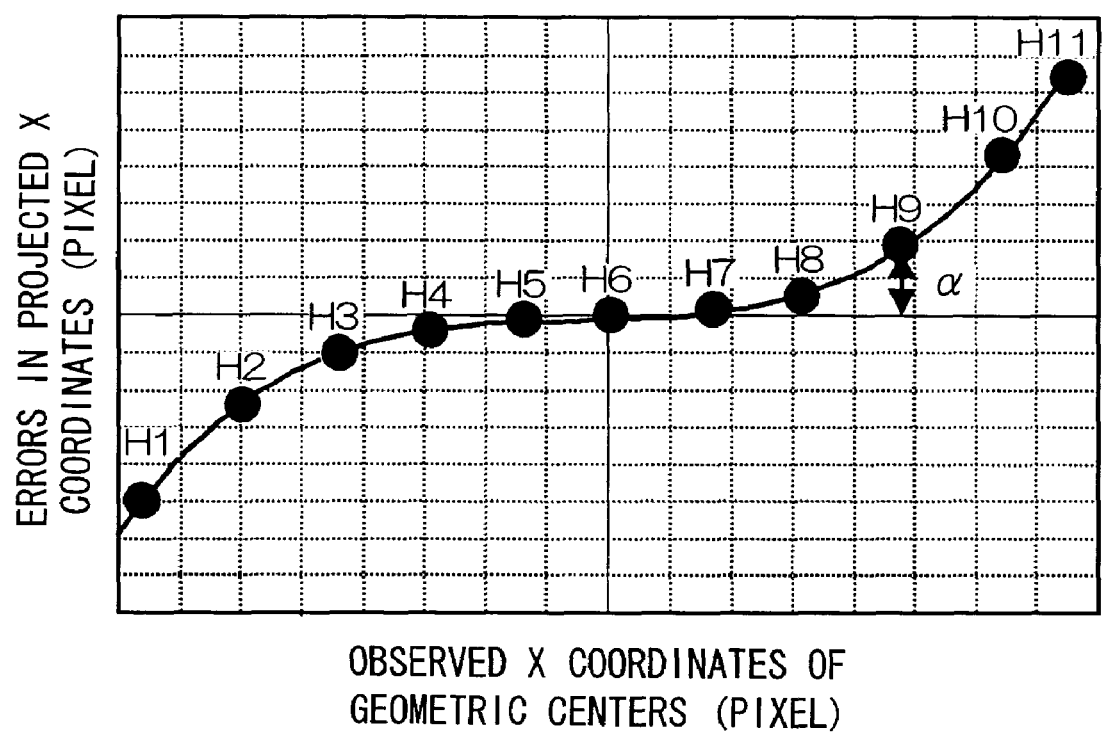
FIG. 7 is a diagram showing a property curve of error in coordinates projected onto an image plane, which was obtained using the apparatus for testing infrared cameras according to the above embodiment.

Moreover, with regard to each position of the binarized target holes H1 to H11 shown in FIG. 5, an error in projected X coordinate is calculated, and then a property curve of error in coordinates projected onto the image plane for the errors in projected X coordinates of the target holes H1 to H11 is obtained with regard to each of the right and left images (step S7). More specifically, as shown in FIG. 7, the property curve of error in the coordinates projected onto the image plane, which corresponds to the errors in projected X coordinates of the target holes H1 to H11, is drawn by plotting points in such a manner that the observed X coordinates of the geometric centers are measured along the x-axis, and the errors in projected X coordinates are measured along the y-axis, and by curve-fitting the plotted points using a line or using a polynomial approximation. Equation (2) shown below is applied to a six-degree polynomial approximation for the property curve of error in the coordinates projected onto the image plane as shown in FIG. 7. The "α" shown in FIG. 7, for example, indicates the error in the projected coordinate of the target hole H9.

$$y = a \cdot x^6 + b \cdot x^5 + c \cdot x^4 + d \cdot x^3 + e \cdot x^2 + f \cdot x + g$$ Equation (2)

The obtained property curve of error in the coordinates projected onto the image plane is stored as a camera coordinates correction parameter (step S8).

Figure 8A:
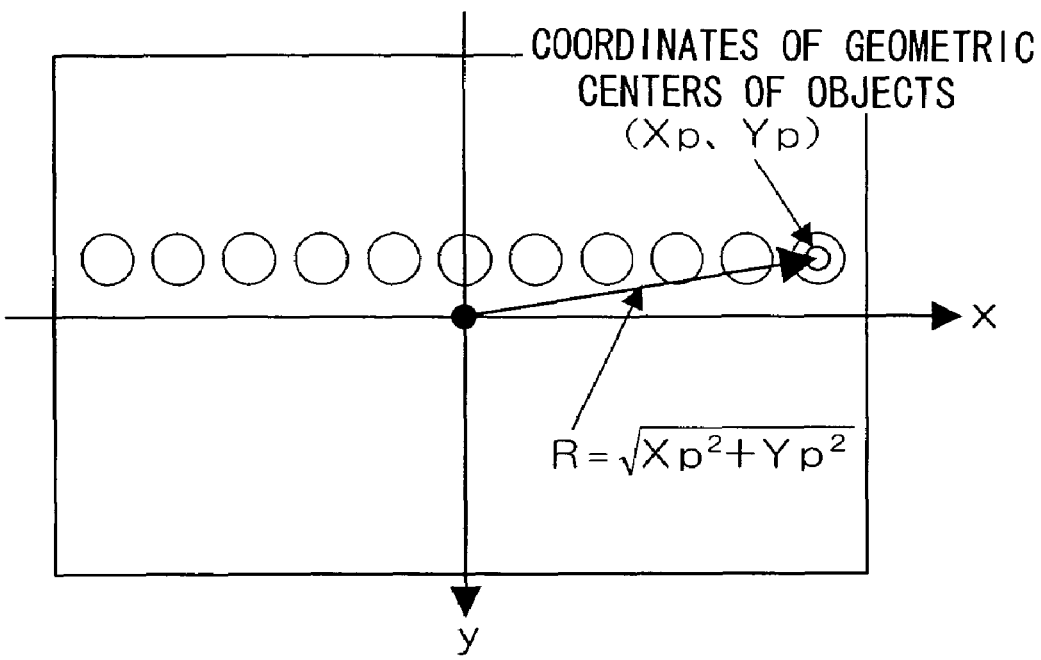
FIG. 8A is a schematic diagram illustrating the relationship between a distance R from the center of a lens to an object and the coordinates of the geometric center of the object.
Figure 8B:
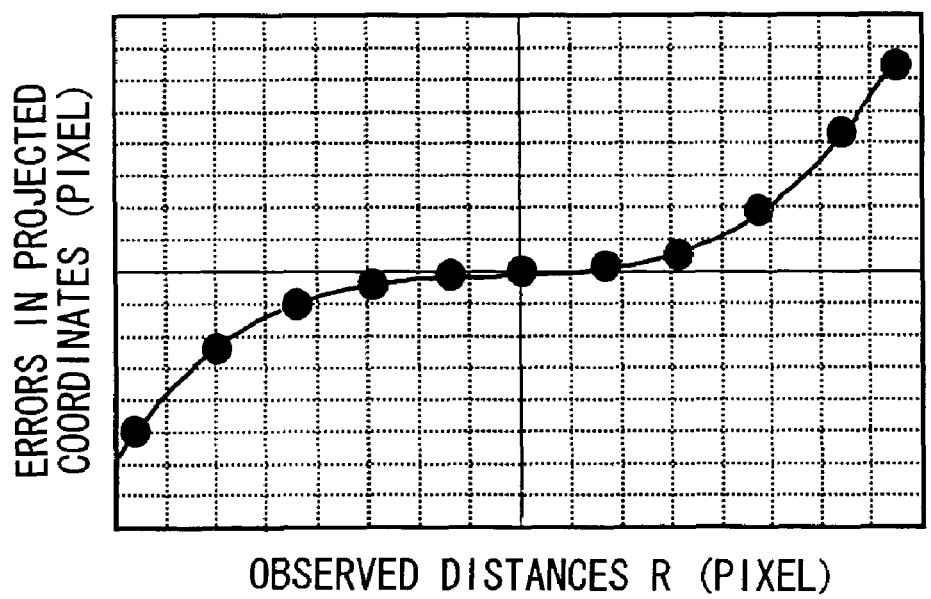
FIG. 8B is a diagram showing the property curve of error in coordinates projected onto an image plane, which was obtained using the apparatus for testing infrared cameras according to the above embodiment, as a property curve of error in coordinates with respect to the distance R.

The property curve of error in the coordinates projected onto the image plane shown in FIG. 7 indicates the errors in the projected X coordinate with respect to the observed X coordinates of the geometric centers of the objects (target holes); however, another property curve of error in the coordinates projected onto the image plane, which indicates the errors in the projected coordinate with respect to the distance from the center of the lens of the camera, may be drawn and used because distortion in a lens is, in general, symmetrical about the center of the lens. More specifically, when the observed coordinates of the geometric center of an object is expressed by "(Xp, Yp)" as shown in FIG. 8A, and the distances R from the center of the lens calculated using Equation (3) are measured along the x-axis instead of the observed X coordinates of the geometric centers in the case of FIG. 7, the errors in the projected coordinate with respect to the distances R from the center of the lens are indicated as shown in FIG. 8B.

$$R = (Xp^2 + Yp^2)^{1/2}$$ Equation (3)

In the above method for obtaining the property curve of error in the coordinates projected onto the image plane based on the differences between the theoretical projected X coordinates and the observed X coordinates of the geometric centers, the position and angle of the camera must be adjusted so that the center target hole H6, which is to be the basis of measurement, is positioned at the center of the image in order to use Equation (1); however, it is difficult to accurately adjust the position and angle of the camera due to limitations in accuracy of installation of the cameras at a factory, due to limitations in accuracy of equipment in the factory.

Figure 9:
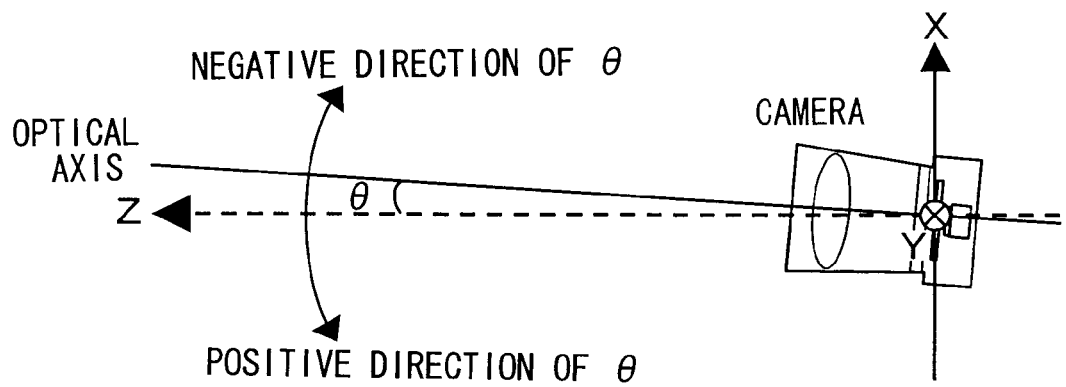
FIG. 9 is a schematic diagram illustrating mounting angle (panning angle θ) of an infrared camera installed on a vehicle.

However, even when the position and angle of the camera are not adjusted, the theoretical projected coordinates can be calculated if an installation angle (i.e., a panning angle) θ of the camera, which is illustrated in FIG. 9, can be found. In this case, the coordinates projected onto the image plane (i.e., the theoretical projected X coordinates) of the target holes H1 to H11 are calculated based on the positions of the target holes H1 to H11 in the actual space using Equation (4).

$$X = \{F \cdot (X \cdot \cos\theta + Z \cdot \sin\theta)\} / \{p \cdot (-X \cdot \sin\theta + Z \cdot \cos\theta)\}$$ Equation (4)

In Equation (4), "x" indicates the coordinate of the target hole projected onto the image, "X" indicates position of the target hole in the actual space shown in FIG. 4, "Z" indicates the distance between the target hole in the actual space and the camera, "p" indicates pitch of pixels, "F" indicates the focal length of the lens of the camera, and "θ" indicates the panning angle of the camera.

Next, another method for obtaining the property curve of error in the coordinates projected onto the image plane using the apparatus for testing infrared cameras according to the present embodiment will be explained.

In another method for obtaining the property curve of error in the coordinates projected onto the image plane, the property curve of error in the coordinates projected onto the image plane is obtained based on the differences between the observed distances and the theoretical distances from the center target hole H6, as the basis of measurement, to the other target holes.

More specifically, in step S3 shown in FIG. 6, grayscale images are obtained, and then a binarization process is applied to each of the right and left images to obtain the binarized images. In the binarization process, regions in the image that are brighter than a brightness threshold ITH are deemed as "1" (i.e., white), and regions in the image that are darker than the brightness threshold ITH are deemed as "0" (i.e., black).

Next, the geometric center of each of the target holes H1 to H11 in the binarized image is calculated.

Figure 10:
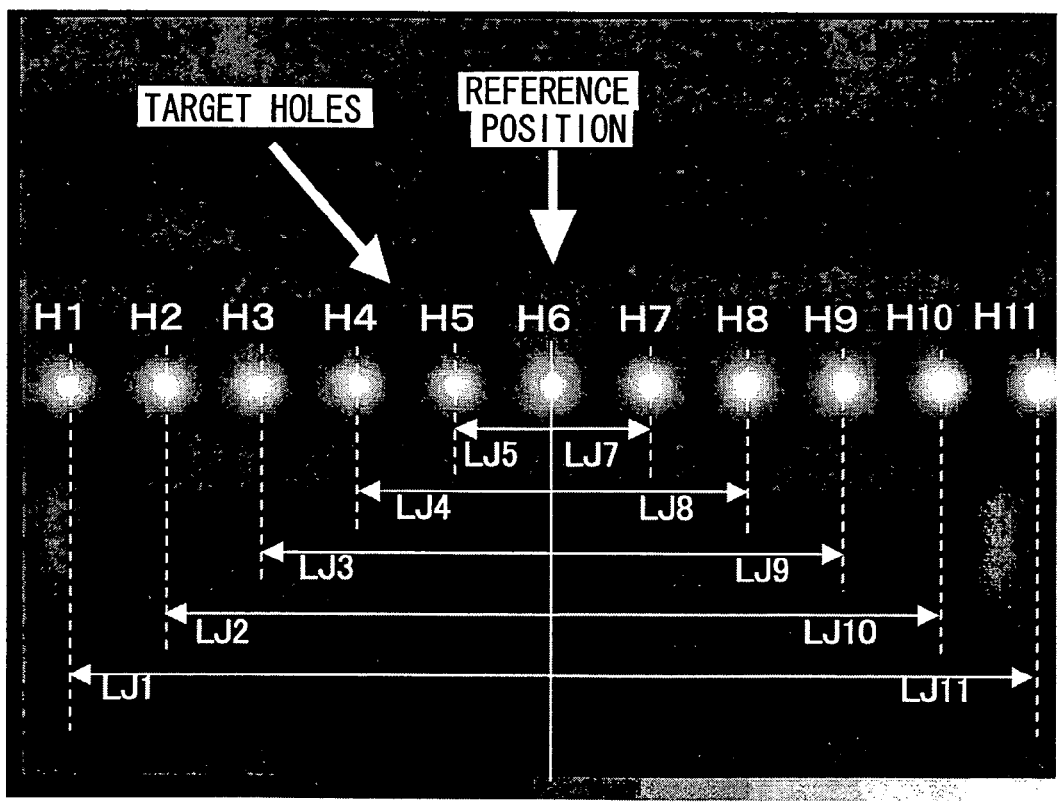
FIG. 10 is a diagram showing a grayscale image of the target portion of the apparatus for testing infrared cameras according to the above embodiment taken by the infrared cameras installed on the vehicle.

As shown in FIG. 10, the distances on the image from the center target hole H6 to the other target holes (i.e., theoretical distances LR1 to LR11) are calculated using Equation (5). Next, the errors in projected X coordinates (the errors in projected X coordinates=the observed distances from the center target hole H6 to the other target holes—the theoretical distances from the center target hole H6 to the other target holes) are obtained based on the observed distances from the center target hole H6 to the other target holes (LJ1 to LJ11) and the theoretical distances from the center target hole H6 to the other target holes (LR1 to LR11).

$$1=(F \cdot L)/(p \cdot Z) \quad \text{Equation (5)}$$

In Equation (5), "1" indicates the distances on the image from the center target hole H6 to the other target holes, "L" indicates the distances in the actual space from the center target hole H6 to the other target holes as shown in FIG. 10, "Z" indicates the distances in the actual space from the target holes to the camera, "p" indicates pitch of pixels, and "F" indicates the focal length of the lens of the camera.

Figure 11:
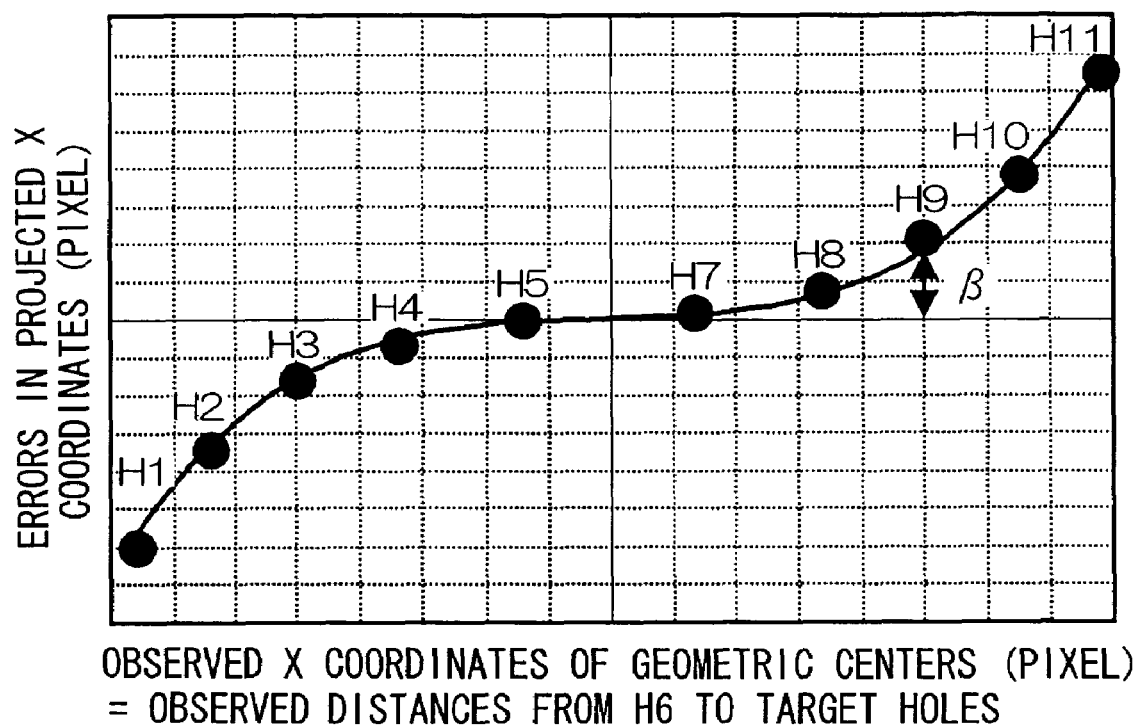
FIG. 11 is a diagram showing another property curve of error in coordinates projected onto an image plane, which was obtained using the apparatus for testing infrared cameras according to the above embodiment in an alternative process.

Moreover, with regard to each position of the binarized target holes H1 to H11 shown in FIG. 5, the error in the projected X coordinate is calculated as shown in TABLE 1, and then a property curve of error in the coordinates projected onto the image plane is obtained based on the errors in the projected X coordinates of the target holes H1 to H11. More specifically, as shown in FIG. 11, the property curve of error in the coordinates projected onto the image plane, which corresponds to the errors in projected X coordinates of the target holes H1 to H11, is drawn by plotting points in such a manner that the observed X coordinates of the geometric centers (i.e., the observed distances from the target hole H6 and to the other target holes) are measured along the x-axis, and the errors in projected X coordinates are measured along the y-axis, and by curve-fitting the plotted points using a line or using a polynomial approximation. Equation (2) shown above is applied to a six-degree polynomial approximation for the property curve of error in the coordinates projected onto the image plane as shown in FIG. 11. The "β" shown in FIG. 11, for example, indicates the error in the projected X coordinate (i.e., (LJ9-LR9)) corresponding to the distance from the center target hole H6 to the target hole H9.

TABLE 1

| Target hole | Observed distance from H6 to each of the other target holes | Theoretical distance from H6 to each of the other target holes | Error in the projected X coordinate |
| --- | --- | --- | --- |
| H1 | LJ1 | LR1 | LJ1–LR1 |
| H2 | LJ2 | LR2 | LJ2–LR2 |
| H3 | LJ3 | LR3 | LJ3–LR3 |
| H4 | LJ4 | LR4 | LJ4–LR4 |
| H5 | LJ5 | LR5 | LJ5–LR5 |
| H6 | — | — | |
| H7 | LJ7 | LR7 | LJ7–LR7 |
| H8 | LJ8 | LR8 | LJ8–LR8 |
| H9 | LJ9 | LR9 | LJ9–LR9 |
| H10 | LJ10 | LR10 | LJ10–LR10 |
| H11 | LJ11 | LR11 | LJ11–LR11 |

In the method for obtaining the property curve of error in the coordinates projected onto the image plane based on the differences between the observed distances and the theoretical distances from the center target hole H6, as the basis of measurement, to the other target holes, even when there is a panning angle θ of the cameras, the property curve of error in the coordinates projected onto the image plane can be accurately obtained based on the differences between the observed distances and the theoretical distances from the center target hole H6 to the other target holes because the distances from the center target hole H6 to the other target holes will not change with the panning angle θ.

As explained above, the apparatus for testing infrared cameras according to the present embodiment includes the front plate 3 having the holes arranged in line, and the back plate 2, as the infrared light emission source, disposed behind the front plate 3 while being in parallel with the front plate 3. In the apparatus for testing infrared cameras, by heating the back plate 2 using the temperature adjusting device 6 so that the back plate 2 emits infrared light having an intensity which is greater than that of the infrared light emitted from the front plate 3, the infrared light emitting portions aligned in line can be formed using the infrared light passing through the holes formed in the front plate 3. In contrast, when the back plate 2 is cooled using the temperature adjusting device 6, because the front plate 3 emits infrared light having an intensity which is greater than that of the infrared light emitted from the back plate 2, white and black in the image taken by the infrared camera are reversed.

Moreover, if the front plate 3 has been subjected to a processing for reducing infrared light reflection, the infrared light, which is emitted from the back plate 2, and is then reflected by the vehicle 1 on which the infrared cameras to be tested are installed, can be prevented from being reflected by the front plate 3, and thus effects of the reflected infrared light in the test of the infrared cameras can be eliminated.

Furthermore, by adhering an element having a high infrared emissivity such as paper or carbon to the back plate 2 so that the element emits infrared light having an intensity which is greater than that of the infrared light emitted from the front plate 3, the cost of the apparatus for testing infrared cameras can be reduced because the temperature adjusting device 6 for heating the back plate 2 may be omitted.

In addition, by making the front plate 3 vertically movable in front of the back plate 2, the vertical level of the front plate 3 can be adjusted in accordance with the vertical levels of the infrared cameras even when the vertical levels of the infrared cameras are changed due to change in the model of the vehicle 1. Moreover, by moving the front plate 3 from a position in front of the back plate 2 so as to make the distance between the front plate 3 and the back plate 2, the front plate 3 is prevented from being heated unnecessarily, which leads to emission of unnecessary infrared light, or the front plate 3 is prevented from being cooled unnecessarily, which leads to non-emission of necessary infrared light.

Accordingly, the distortions of the lenses in various directions and variations in the focal lengths of the lenses used in the infrared cameras to be tested can be confirmed as the property curve of error in the coordinates projected onto the image plane by taking the images of the infrared emitting portions uniformly formed using the apparatus for testing infrared cameras, and by comparing the positions of the infrared emitting portions in the actual space with the coordinates of the infrared emitting portions projected onto the image plane.

Advantageous Effects of the Invention

As explained above, according to the apparatus for testing infrared cameras of the present invention, by disposing the emission source in parallel to and behind the cover plate which has holes arranged in line, and by making the emission source emit infrared light having an intensity which is greater than that of the infrared light emitted from the cover plate, infrared light emitting portions aligned in line can be formed using the infrared light passing through the holes formed in the cover plate. On the other hand, by making the emission source emit infrared light having an intensity which is less than that of the infrared light emitted from the cover plate, infrared light non-emitting portions aligned in line can be formed due to difference between the intensity of the infrared light emitted from the emission source and the intensity of the infrared light emitted from a portion of the cover plate other than the holes.

Therefore, the testing of the infrared cameras can be accurately performed using the infrared light emitting portions which are clearly delimited, or using the infrared light non-emitting portions which are taken by the infrared cameras as a reversed pattern when compared with the infrared light emitting portions.

According to another apparatus for testing infrared cameras of the present invention, the infrared light emitting portions which are accurately aligned or the infrared light non-emitting portions which are accurately aligned can be easily formed by heating the metal plate using the heat source, or by cooling the metal plate using the heat source so that infrared light is uniformly emitted from the metal plate.

Therefore, by controlling the heat source, the contrast in the image of the emission source taken by the infrared cameras can be increased, and the testing of the infrared cameras can be accurately performed.

According to another apparatus for testing infrared cameras of the present invention, because the element having an infrared emissivity that is higher than that of the cover plate is adhered to the metal plate, the infrared light emitting portions which are accurately aligned can be formed at low cost by making the element uniformly emit infrared light.

Therefore, the cost of the apparatus for testing infrared cameras can be reduced.

According to another apparatus for testing infrared cameras of the present invention, because the cover plate has been subjected to a processing for reducing infrared light reflection, the infrared light emitted from the emission source can be prevented from being reflected by a vehicle on which the infrared cameras to be tested are installed, and also reflected infrared light can be prevented from being reflected by the cover plate.

Therefore, distortions in the infrared light emitting portions or in the infrared light non-emitting portions due to the infrared light reflected by the vehicle and reflected by the cover plate can be prevented, and the testing of the infrared cameras can be accurately performed.

According to another apparatus for testing infrared cameras of the present invention, the vertical level of the cover plate can be adjusted in accordance with the vertical levels of the infrared cameras to be tested. In addition, by moving the cover plate from a position in front of the emission source, the cover plate is prevented from being heated unnecessarily, which leads to emission of unnecessary infrared light, or the cover plate is prevented from being cooled unnecessarily, which leads to non-emission of necessary infrared light.

Therefore, in a manufacturing line of automobiles, for example, the vertical level of the cover plate can be adjusted to the level of the infrared cameras to be tested depending on the models of the vehicle. The cover plate is disposed in front of the emission source only when the cover plate is required in the testing of the infrared cameras which is not continuously performed so that the infrared light emitting portions which are accurately aligned or the infrared light non-emitting portions which are accurately aligned are formed, and thus the testing of the infrared cameras can be accurately performed at any time.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An apparatus for testing infrared cameras, comprising:
   a cover plate which has a plurality of holes formed therethrough and arranged in line, said cover plate adapted to emit an amount of infrared light;
   a pair of spaced-apart support pillars formed from a material having low thermal conductivity, the cover plate being operatively attached to the support pillars so as to be vertically adjustable thereon; and
   an emission source which is operatively attached to the support pillars and disposed in parallel to and behind the cover plate as viewed from infrared cameras to be tested, and which is adapted to emit a different amount of infrared light when compared with the cover plate, the emission source comprising a metal plate, and an element which is adhered to the metal plate, and which has an infrared emissivity that is different from that of the cover plate.

2. An apparatus for testing infrared cameras, according to claim 1, wherein the emission source comprises a heat source which is connected to the metal plate.

3. An apparatus for testing infrared cameras, comprising:
   a cover plate which has holes arranged in line, and which is adapted to emit an amount of infrared light; and
   an emission source which is disposed in parallel to and behind the cover plate as viewed from infrared cameras to be tested, and which is adapted to emit a different amount of infrared light when compared with the cover plate,
   wherein the emission source comprises a metal plate, and an element which is adhered to the metal plate, and which has an infrared emissivity that is higher than that of the cover plate.

4. An apparatus for testing infrared cameras, according to claim 1, wherein the cover plate has been subjected to a processing for reducing infrared reflection.

5. An apparatus for testing infrared cameras, comprising: a cover plate which has holes arranged in line, and which is adapted to emit an amount of infrared light; and an emission source which is disposed in parallel to and behind the cover plate as viewed from infrared cameras to be tested, and which is adapted to emit a different amount of infrared light when compared with the cover plate;

wherein the cover plate is vertically movable in front of the emission source as viewed from the infrared cameras to be tested from a first position at which testing of the infrared cameras is executed to a second position which is higher than the first position.

6. An apparatus for testing infrared cameras, according to claim 5, wherein the second position is sufficiently higher than the first position such that the cover plate is not heated by a heat source of the emission source.

7. An apparatus for testing infrared cameras according to claim 1, wherein the emission source comprises a heating and cooling source which is connected to the metal plate.

8. An apparatus for testing infrared cameras according to claim 3, wherein said metal plate is aluminum.

9. An apparatus for testing infrared cameras according to claim 1, wherein paper is adhered to a front of said cover plate to reduce infrared reflection therefrom.

10. An apparatus for testing infrared cameras according to claim 3, further including pillars along which at least one of the metal plate and cover plate are vertically movable.

11. An apparatus for testing infrared cameras according to claim 10, wherein both said metal plate and cover plate are vertically movable along said pillars.

12. An apparatus for testing infrared cameras according to claim 10, wherein said pillars are formed of a material having low thermal conductivity.

* * * * *